US012709344B2

(12) United States Patent
Zhang et al.

(10) Patent No.: US 12,709,344 B2
(45) Date of Patent: Aug. 18, 2026

(54) COUNTERWEIGHT STRUCTURE, ROBOT AND METHOD FOR CONTROLLING ROBOT

(71) Applicant: GOERTEK INC., Weifang (CN)

(72) Inventors: Xing Zhang, Weifang (CN); Chengkai Guo, Weifang (CN); Yuanjing Zheng, Weifang (CN)

(73) Assignee: GOERTEK INC., Weifang (CN)

( * ) Notice: Subject to any disclaimer, the term of this patent is extended or adjusted under 35 U.S.C. 154(b) by 331 days.

(21) Appl. No.: 18/405,082

(22) Filed: Jan. 5, 2024

(65) Prior Publication Data

US 2024/0158028 A1 May 16, 2024

Related U.S. Application Data

(63) Continuation of application No. PCT/CN2021/120959, filed on Sep. 27, 2021.

(30) Foreign Application Priority Data

Jul. 30, 2021 (CN) ......................... 202110878962.7

(51) Int. Cl.
*B62D 61/00* (2006.01)

(52) U.S. Cl.
CPC .................................... *B62D 61/00* (2013.01)

(58) Field of Classification Search
CPC .. B62D 61/00; B62D 63/02; B25J 5/00; B25J 11/00; B25J 19/00
See application file for complete search history.

(56) References Cited

U.S. PATENT DOCUMENTS

| | | |
|---|---|---|
| 8,788,130 B1 | 7/2014 | Tran et al. |
| 2019/0094874 A1 | 3/2019 | Ogawa et al. |
| 2020/0331546 A1 | 10/2020 | Liu et al. |

FOREIGN PATENT DOCUMENTS

| | | |
|---|---|---|
| CN | 102179812 A | 9/2011 |
| CN | 103407512 A | 11/2013 |
| CN | 103895725 A | 7/2014 |
| CN | 103895726 A | 7/2014 |
| CN | 204184488 U | 3/2015 |
| CN | 204249765 U | 4/2015 |
| CN | 105438299 A | 3/2016 |
| CN | 106347512 A | 1/2017 |
| CN | 108278455 A | 7/2018 |
| CN | 208422143 U | 1/2019 |

(Continued)

OTHER PUBLICATIONS

First Office Action in Corresponding Chinese Application No. 202110878962.7, dated Feb. 27, 2025; 15 pgs.

(Continued)

*Primary Examiner* — Drew J Brown
(74) *Attorney, Agent, or Firm* — HAUPTMAN HAM, LLP

(57) ABSTRACT

Disclosed are a counterweight structure, a robot and a method for controlling the robot. The counterweight structure includes an electromagnetic device, a counterweight block and a reset piece. The reset piece is clamped between the electromagnetic device and the counterweight block. The electromagnetic device is magnetic after being powered on, to attract the counterweight block to move towards the electromagnetic device and compress the reset piece.

8 Claims, 12 Drawing Sheets

(56) References Cited

FOREIGN PATENT DOCUMENTS

| | | | | | |
|---|---|---|---|---|---|
| CN | 110802604 | A | | 2/2020 | |
| CN | 210282307 | U | | 4/2020 | |
| CN | 111113482 | A | * | 5/2020 | .............. B25J 19/00 |
| CN | 111515976 | A | | 8/2020 | |
| CN | 112129356 | A | | 12/2020 | |
| CN | 112873167 | A | * | 6/2021 | ................ B25J 9/16 |
| CN | 113086039 | A | | 7/2021 | |
| CN | 116061214 | A | * | 5/2023 | .............. B25J 11/00 |
| CN | 117021160 | A | * | 11/2023 | .............. B25J 19/00 |
| CN | 117863229 | A | * | 4/2024 | ............ B25J 9/0009 |
| CN | 118665896 | A | * | 9/2024 | ................ B25J 5/00 |
| CN | 119550370 | A | * | 3/2025 | .............. B25J 11/00 |
| CN | 120135303 | A | * | 6/2025 | ............. B62D 63/02 |
| JP | 2003305671 | A | | 10/2003 | |
| JP | 2019041877 | A | | 3/2019 | |
| KR | 101507565 | B1 | | 4/2015 | |

OTHER PUBLICATIONS

Second Office Action in Corresponding Chinese Application No. 202110878962.7, dated Oct. 25, 2025; 14 pgs.
International Search Report and Written Opinion in Corresponding International Application No. PCT/CN2021/120959, mailed Jan. 20, 2022; 13 pgs.
Notice of Grant in Corresponding Chinese Application No. 202110878962.7, dated Feb. 16, 2026; 5 pgs.

* cited by examiner

COUNTERWEIGHT STRUCTURE, ROBOT AND METHOD FOR CONTROLLING ROBOT

CROSS-REFERENCE TO RELATED APPLICATIONS

This application is a continuation application of International Application No. PCT/CN2021/120959, filed on Sep. 27, 2021, which claims priority to Chinese Patent Application No. 202110878962.7, filed on Jul. 30, 2021. The disclosures of the above-mentioned applications are incorporated herein by reference in their entireties.

TECHNICAL FIELD

The present application relates to the technical field of robots, and in particular to a counterweight structure, a robot and a method for controlling a robot.

BACKGROUND

With the progress of society and the development of network technology, more and more robot forms have been produced. In recent years, spherical robots have attracted more and more attention from people, and spherical robots have also paid more and more attention to the actual experience effect. In order to ensure the smooth operation of the spherical robot, the spherical robot is usually equipped with a counterweight block to lower the center of gravity of the spherical robot. However, in the related art, the position of the counterweight block is fixed. During the acceleration or deceleration process of the spherical robot, the position of the counterweight block cannot be adjusted, resulting in the sphere robot's operation being less smooth and fluid.

SUMMARY

The present application provides a counterweight structure, a robot and a method for controlling a robot, aiming to make the position of the center of gravity of the counterweight structure adjustable.

In order to achieve the above objectives, the counterweight structure proposed by the present application includes an electromagnetic device, a counterweight block and a reset piece. The reset piece is clamped between the electromagnetic device and the counterweight block, and the electromagnetic device is magnetic after being powered on, to attract the counterweight block to move towards the electromagnetic device and compress the reset piece.

In an embodiment of the present application, the electromagnetic device includes:

- an inner core provided at a position corresponding to the counterweight block, the reset piece being clamped between the inner core and the counterweight block; and
- a coil winding around an outer periphery of the inner core, after the coil being powered on, the inner core being magnetized to attract the counterweight block to move towards the inner core.

In an embodiment of the present application, the inner core is provided with a mating hole, the counterweight block is provided with a sliding rod, the sliding rod is movably provided in the mating hole, and the reset piece is sleeved on the sliding rod.

In an embodiment of the present application, the counterweight block is provided with an annular protrusion. The annular protrusion is sleeved on the sliding rod and an installation gap is formed between the annular protrusion and the sliding rod. The reset piece is provided in the installation gap.

In an embodiment of the present application, the counterweight structure includes two electromagnetic devices and two reset pieces. The two electromagnetic devices are respectively provided at two opposite sides of the counterweight block, and each of the two reset pieces is clamped between the counterweight block and one of the two electromagnetic devices; and/or the reset piece is a spring.

The present application further provides a robot including:

- a robot body provided with an installation cavity, a control component being provided in the installation cavity; and
- the counterweight structure as mentioned above. The counterweight structure is provided in the installation cavity, the electromagnetic device of the counterweight structure is electrically connected to the control component, and the control component is configured to control the electromagnetic device to be powered on or off.

In an embodiment of the present application, a cavity wall of the installation cavity is provided with a limiting groove, and a part of the counterweight block of the counterweight structure is movably limited in the limiting groove.

In an embodiment of the present application, the robot body includes a main body and two driving wheels, and the main body is provided with the installation cavity. The two driving wheels are respectively provided at two opposite sides of the main body, and each of the two driving wheels includes:

- a rotating assembly provided with an accommodation groove, a notch of the accommodation groove being sleeved at an outer sidewall of the main body to allow the accommodation groove to communicate with the installation cavity;
- a support seat connected to the main body, the support seat being provided in the installation cavity or the accommodation groove, and the support seat being rotationally connected to the rotating assembly through a bearing; and
- a driving piece provided in the installation cavity or the accommodation groove, the driving piece being provided at the support base and being electrically connected to the control component, and an output end of the driving piece being connected to the rotating assembly.

In an embodiment of the present application, the rotating assembly includes:

- a housing provided with the accommodation groove; and
- a transmission piece provided in the accommodation groove and located between the housing and the support base, the transmission piece being connected to the bearing, and the transmission piece being detachably connected to the housing.

The present application further provides a method for controlling the robot as mentioned above. The method for controlling the robot includes following steps:

- obtaining an operation acceleration of the robot; and
- controlling the electromagnetic device to be powered on if the operation acceleration of the robot is greater than or less than zero, so that the moving direction of the counterweight block is consistent with the acceleration direction.

In the technical solutions of the present application, after the electromagnetic device is magnetic, the counterweight block is attracted to move towards the electromagnetic device. After the magnetism of the electromagnetic device disappears, the counterweight block moves away from the electromagnetic device under the action of the reset piece. The present application utilizes the characteristic that the electromagnetic device will be magnetic when the electromagnetic device is powered on and the magnetism will disappear after the electromagnetic device is powered off, so that the counterweight block can move to adjust the position of the center of gravity of the counterweight structure.

For the robot with the counterweight structure, during the operation of the robot, the electromagnetic device is controlled to be powered on or off to make the moving direction of the counterweight block consistent with the acceleration direction, so that the position of the counterweight block can be adjusted. In this way, the counterweight structure can quickly adjust the position of the counterweight block to adjust the center of gravity of the counterweight block, so that the robot can operate more freely and smoothly.

BRIEF DESCRIPTION OF THE DRAWINGS

To illustrate the technical solutions according to embodiments of the present application or the related art more clearly, the accompanying drawings for describing the embodiments or the related art are introduced briefly in the following. Apparently, the accompanying drawings in the following description are only some embodiments of the present application. Persons of ordinary skill in the art can derive other drawings from the accompanying drawings without creative efforts.

The realization of the objective, functional characteristics, and advantages of the present application are further described with reference to the accompanying drawings.

DETAILED DESCRIPTION OF THE EMBODIMENTS

The technical solutions of the embodiments of the present application will be described in detail below with reference to the accompanying drawings. It is obvious that the embodiments to be described are only some rather than all of the embodiments of the present application. All other embodiments obtained by persons skilled in the art based on the embodiments of the present application without creative efforts shall fall within the scope of the present application.

It should be noted that the directional indications (such as up, down, left, right, front, back . . . ) in the embodiments of the present application are only used to explain the relative positional relationship, movement, and the like of the components in a certain posture (as shown in the accompanying drawings). If the certain posture changes, the directional indication will also change accordingly.

Besides, the descriptions associated with, e.g., “first” and “second,” in the present application are merely for descriptive purposes, and cannot be understood as indicating or suggesting relative importance or impliedly indicating the number of the indicated technical feature. Therefore, the feature associated with “first” or “second” can expressly or impliedly include at least one such feature. In addition, the meaning of “and/or” appearing in the entire text is to include three parallel solutions, for example, “A and/or B” includes solution A, or solution B, or a solution that satisfies both A and B at the same time. Further, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present application.

The present application provides a counterweight structure 250 that can be applied to sports equipment, and the sports equipment can be a robot.

Figure 2:
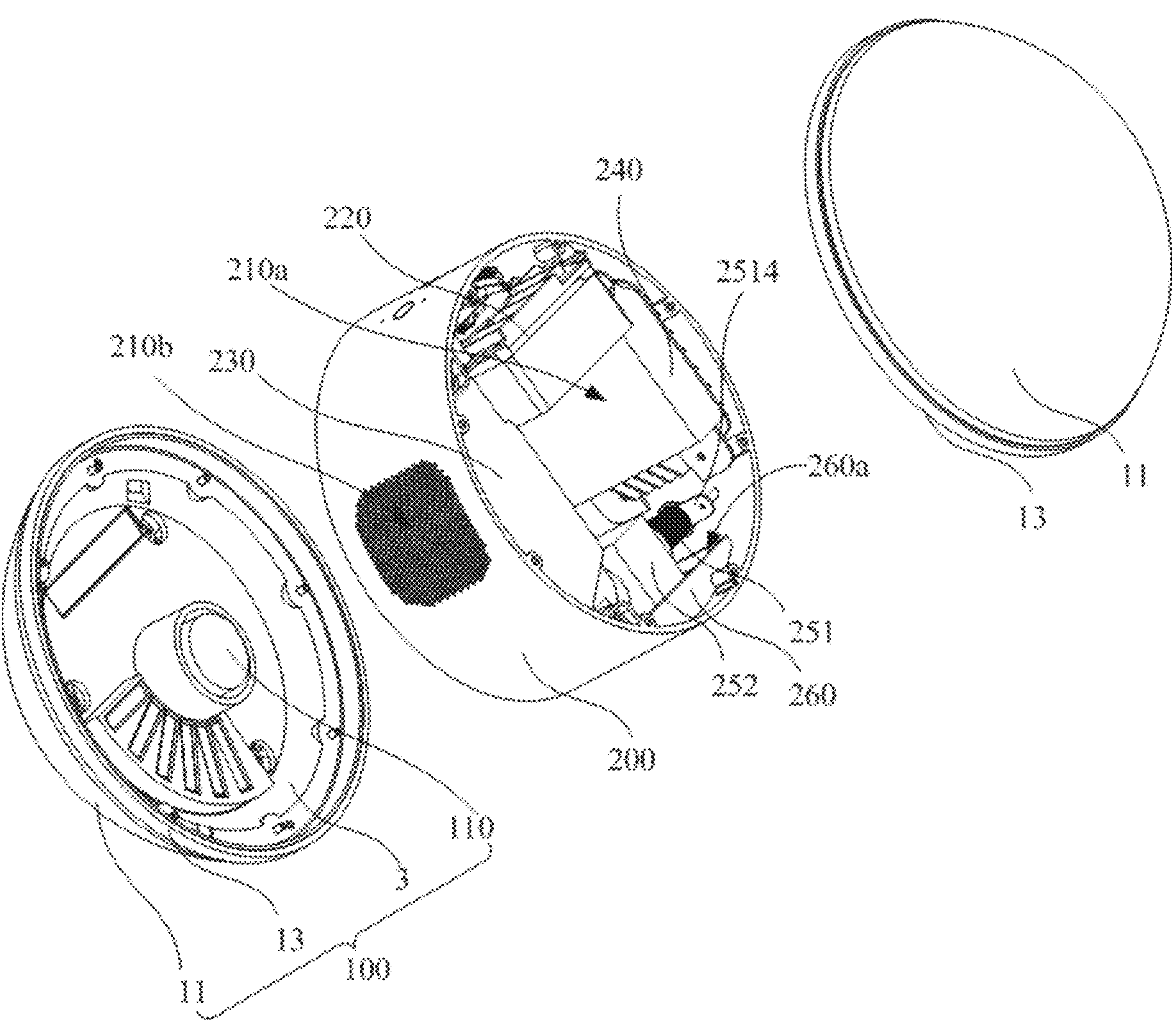
FIG. 2 is an exploded schematic view of FIG. 1.
Figure 3:
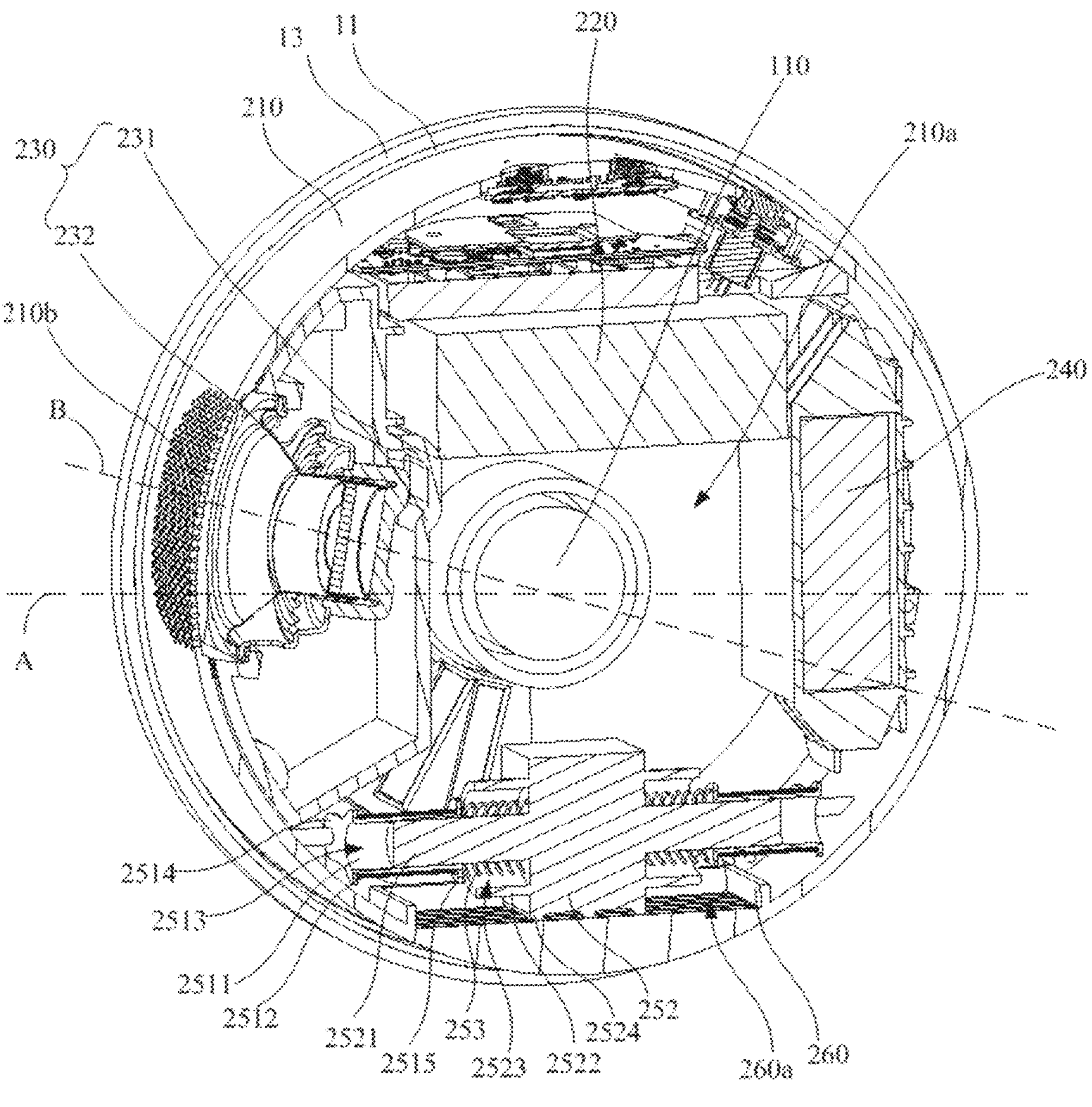
FIG. 3 is a schematic cross-sectional view of FIG. 1.
Figure 4:
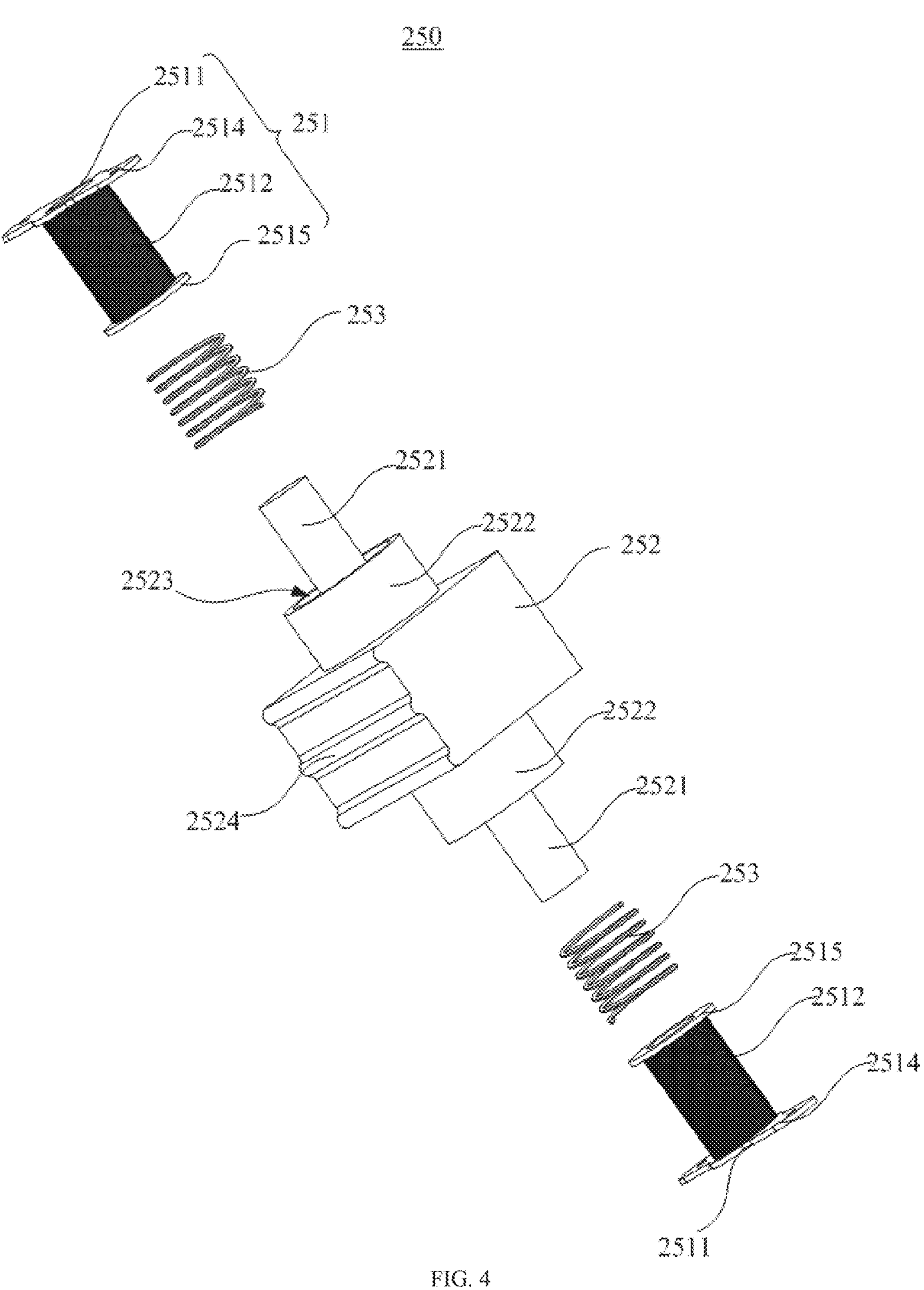
FIG. 4 is a schematic structural view of a counterweight structure according to an embodiment of the present application.

In an embodiment of the present application, as shown in FIG. 2 to FIG. 4, the counterweight structure 250 includes an electromagnetic device 251, a counterweight block 252 and a reset piece 253. The reset piece 253 is clamped between the electromagnetic device 251 and the counterweight block 252.

The electromagnetic device 251 is magnetic after being powered on, attracting the counterweight block 252 to move towards the electromagnetic device 251 to compress the reset piece 253.

In this embodiment, after the electromagnetic device 251 is magnetic, the counterweight block 252 is attracted to move towards the electromagnetic device 251. After the magnetism of the electromagnetic device 251 disappears, the counterweight block 252 moves away from the electromagnetic device 251 under the action of the reset piece 253. The present application utilizes the characteristic that the electromagnetic device 251 will be magnetic when the electromagnetic device 251 is powered on and the magnetism will disappear after the electromagnetic device 251 is powered off, so that the counterweight block 252 can move to adjust the position of the center of gravity of the counterweight structure 250.

Figure 1:
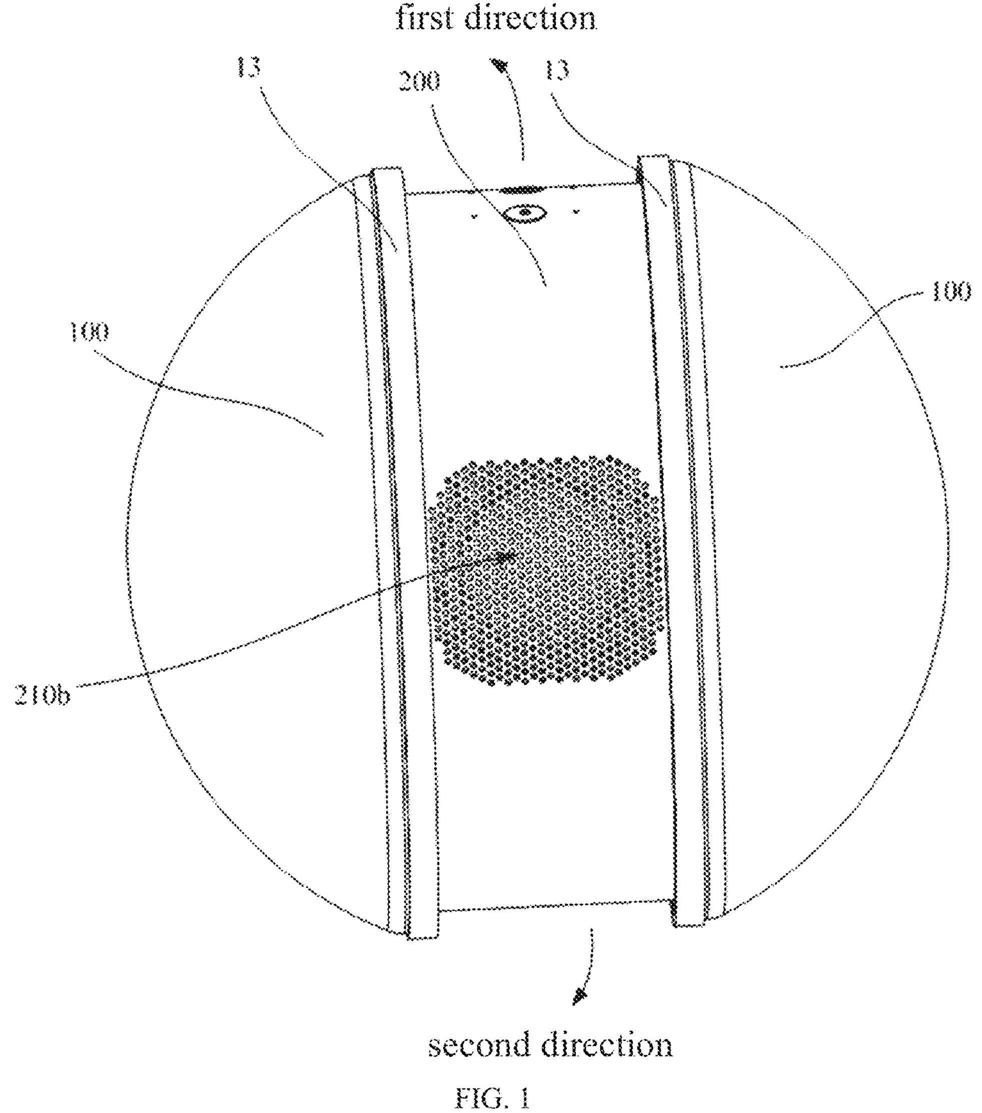
FIG. 1 is a schematic structural view of a robot according to an embodiment of the present application.

When the counterweight structure 250 is applied to a robot, during the operation of the robot, the electromagnetic device 251 is controlled to be powered on or off to make the moving direction of the counterweight block 252 consistent with the acceleration direction, so that the position of the counterweight block 252 can be adjusted. In this way, the counterweight structure 250 can quickly adjust the position of the counterweight block 252 to adjust the center of gravity of the counterweight block 252, so that the robot can operate more freely and smoothly. As shown in FIG. 1, the robot includes a main body 200 and two driving wheels 100. The main body 200 includes many functional components and needs to be stable at all times. However, in the related art, when the robot starts, the main body 200 moves along the first direction due to the inertia. When the robot stops, the main body 200 rotates along the second direction due to the inertia. This embodiment can solve this problem by providing a counterweight structure 250, so that the main body 200 of the robot can always keep stable.

In some embodiments, the number of the electromagnetic device 251 can be one. Through the electromagnetic device 251, when the counterweight structure 250 accelerates along with the robot, the position of the center of gravity of the counterweight structure 250 can be adjusted through the action of the electromagnetic device 251 on the counterweight block 252, so that the center of gravity of the robot can be adjusted to make the robot operate more freely and smoothly. When the robot starts or accelerates during operation, the acceleration direction of the robot is the same as the operation direction of the robot. In this case, the electromagnetic device 251 is powered on and will attract the counterweight block 252 to move, and the moving direction of the counterweight block 252 is consistent with the acceleration direction. That is, the moving direction of the counterweight block 252 is the same as the operation direction of the robot, so as to adjust the center of gravity of the robot and make the robot operate more freely and smoothly. In addition, the time of the acceleration process or the startup process can also be reduce to save some power. When the acceleration process of the robot is finished and the robot moves at a constant speed, the electromagnetic device 251 is powered off and the magnetism disappears. The counterweight block 252 will slide to the initial position under the action of the reset piece 253 to ensure that the robot can keep stable when operating at a constant speed.

In other embodiments, the number of the electromagnetic device 251 is one. Through the electromagnetic device 251, when the counterweight structure 250 decelerates along with the robot, the position of the center of gravity of the counterweight structure 250 can be adjusted through the action of the electromagnetic device 251 on the counterweight block 252, so that the center of gravity of the robot can be adjusted to make the robot operate more freely and smoothly. When the robot stops or decelerates during operation, the acceleration direction of the robot is opposite to the operation direction of the robot. In this case, the electromagnetic device 251 is powered on and will attract the counterweight block 252 to move, and the moving direction of the counterweight block 252 is consistent with the acceleration direction. That is, the moving direction of the counterweight block 252 is opposite to the operation direction of the robot, to adjust the center of gravity of the robot and make the robot operate more freely and smoothly. In addition, the time of the deceleration process or the stop process can also be reduced to save some power. When the deceleration process of the robot is finished and the robot moves at a constant speed, the electromagnetic device 251 is powered off and the magnetism disappears. The counterweight block 252 will slide to the initial position under the action of the reset piece 253 to ensure that the robot can keep stable when the robot operates at a constant speed or the robot is in a stationary state.

In some embodiments, the number of electromagnetic devices 251 is two. As shown in FIG. 3 and FIG. 4, the number of reset pieces 253 is also two. The two electromagnetic devices 251 are respectively provided at opposite sides of the counterweight block 252. Each reset piece 253 is clamped between the counterweight block 252 and one of the two electromagnetic devices 251.

It can be understood that by arranging two electromagnetic devices 251 and two reset pieces 253, when the counterweight structure 250 accelerates along with the robot and when the counterweight structure 250 decelerates along with the robot, the position of the center of gravity of the counterweight structure 250 can be adjusted through the action of the electromagnetic device 251 on the counterweight block 252, so that the center of gravity of the robot can be adjusted to make the robot operate more freely and smoothly. By arranging the electromagnetic device 251 and the reset piece 253 at the opposite sides of the counterweight block 252, the center of gravity of the counterweight structure 250 can be adaptively adjusted according to the operation state of the robot, so that the entire operation process of the robot can be smooth.

In this embodiment, the reset piece 253 is a spring. Both ends of the spring abut against the electromagnetic device 251 and the counterweight block 252 respectively.

In an embodiment of the present application, as shown in FIG. 3 and FIG. 4, the electromagnetic device 251 includes: an inner core 2511 and a coil 2512.

The inner core 2511 is provided at a position corresponding to the counterweight block 252, and the reset piece 253 is clamped between the inner core 2511 and the counterweight block 252.

The coil 2512 winds around the outer periphery of the inner core 2511.

After the coil 2512 is powered on, the inner core 2511 is magnetized to attract the counterweight block 252 to move towards the inner core 2511.

It can be understood that when current flows through the coil 2512, a magnetic field will be generated around the coil 2512. The inner core 2511 will be magnetized, and the magnetic field will be greatly enhanced. The counterweight block 252 will move towards the inner core 2511 due to the magnetic force, and will compress the reset piece 253. When the coil 2512 is powered off, the magnetic field disappears, the magnetism of the inner core 2511 disappears, and the counterweight block 252 is reset under the action of the reset piece 253.

In this embodiment, the inner core 2511 is made of ferromagnetic material. To ensure that the inner core 2511 is demagnetized faster after the coil 2512 is powered off, soft iron or silicon steel materials that demagnetize quickly can be adopted.

In this embodiment, as shown in FIG. 3 and FIG. 4, the inner core 2511 is provided with a contact portion 2515, and the reset piece 253 abuts against the contact portion 2515. The inner core 2511 is also provided with an installation portion 2514, in which the inner core 2511 can be fixedly installed at the robot through screws.

In this embodiment, as shown in FIG. 3 and FIG. 4, the installation portion 2514 and the contact portion 2515 are respectively provided at both ends of the inner core 2511, and are enclosed to form a coil groove 2516. The coil 2512 is wound inside the coil groove 2516.

In an embodiment of the present application, as shown in FIG. 3 and FIG. 4, the inner core 2511 is provided with a mating hole 2513, and the counterweight block 252 is provided with a sliding rod 2521. The sliding rod 2521 is movably provided in the mating hole 2513, and the reset piece 253 is sleeved on the sliding rod 2521.

In this embodiment, the outer peripheral wall of the sliding rod 2521 abuts against the hole wall of the mating hole 2513. The arrangements of the mating hole 2513 and the sliding rod 2521 can guide the movement of the counterweight block 252 and the movement stability of the counterweight block 252 can be improved, thereby ensuring the stability of the robot. In addition, the sliding rod 2521 provides an installation and positioning basis for the reset piece 253. The sliding rod 2521 can share a part of the weight of the counterweight block 252. In this way, the size of the counterweight block 252 can be reduced accordingly, and a part counterweight is evenly distributed along the operation direction, making the counterweight structure 250 more stable. When the counterweight structure 250 is applied to robots, the robot can operate more stably.

In an embodiment of the present application, as shown in FIG. 3 and FIG. 4, the counterweight block 252 is provided with an annular protrusion 2522. The annular protrusion 2522 is sleeved on the sliding rod 2521 and an installation gap 2523 is formed between the annular protrusion 2522 and the sliding rod 2521. The reset piece 253 is provided in the installation gap 2523.

It can be understood that the annular protrusion 2522 can share a part of the weight of the counterweight block 252. In this way, the size of the counterweight block 252 can be further reduced accordingly, and a part counterweight can be evenly distributed along the operation direction, so that the counterweight block 252 can be more stable. When the counterweight structure 250 is applied to robots, the robot can operate more stably. In addition, the annular protrusion 2522 and the sliding rod 2521 are spaced apart to form the installation gap 2523, which provides an installation space for the reset piece 253. The structural layout is reasonable, which avoids excessive size of the counterweight structure 250 along the length direction of the sliding rod 2521. When the counterweight structure 250 is installed at the robot, especially a spherical robot with a circular cross section of the installation cavity 210*a*, the smaller the size of the counterweight structure 250, the lower the installation position of the counterweight structure 250 can be. Thus, the center of gravity of the counterweight structure 250 is lowered, which can further improve the stability of the robot.

The present application further provides a robot, as shown in FIG. 1 to FIG. 3, the robot includes: a robot body and a counterweight structure 250.

The robot body is provided with an installation cavity 210*a* and the installation cavity 210*a* is provided with a control component.

The counterweight structure 250 is provided in the installation cavity 210*a*. The electromagnetic device 251 of the counterweight structure 250 is electrically connected to the control component. The control component controls the electromagnetic device 251 to be powered on or off.

The specific structure of the counterweight structure 250 can refer to the above-mentioned embodiments. Since this robot adopts all the technical solutions of the above-mentioned embodiments, it has at least all the beneficial effects brought by the technical solutions of the above-mentioned embodiments, which will not be repeated here.

The control component can control and detect the operation state of the robot.

In some embodiments, an acceleration sensor or a gyroscope is provided in the installation cavity 210*a*. The acceleration sensor or the gyroscope is electrically connected to the control component. The acceleration sensor or the gyroscope can detect the operation acceleration of the robot and send the signal to the control component. When the robot accelerates or decelerates, the control component can control the electromagnetic device 251 to be powered on or off to adjust the center of gravity of the counterweight structure 250 timely. The counterweight structure 250 and the control component are both provided in the installation cavity 210*a*, which can facilitate the connection between the counterweight structure 250 and the control component.

In other embodiments, the control component is provided with a receiving module. The receiving module can directly receive external control instructions. For example, the receiving module can be a device such as a Bluetooth device, an infrared device, or an audio pickup device. The receiving module can receive instructions sent by the user through a remote control or a mobile phone, or can directly obtain and decode the user's voice instruction. Then the control component controls the electromagnetic device 251 to be powered on or off according to the control instruction, to adjust the position of the center of gravity of the counterweight structure 250 timely and quickly. When the control instruction is to start or stop the robot, the robot body may rotate along the first direction or the second direction due to inertia. The electromagnetic device 251 is controlled to be powered on, and the center of gravity of the counterweight structure 250 is adjusted in time, thereby adjusting the center of gravity of the robot. Therefore, the robot can always maintain stable, which ensures that the functional components of the robot can keep stable and provide a better user experience.

In an embodiment of the present application, as shown in FIG. 2 and FIG. 3, the cavity wall of the installation cavity 210*a* is provided with a limiting groove 260*a*, and a part of the counterweight block 252 of the counterweight structure 250 is movably limited in the limiting groove 260*a*. The limiting groove 260*a* can limit the limiting movement position of the counterweight block 252 and prevent the counterweight block 252 from colliding with other components in the installation cavity 210*a*.

In this embodiment, a limiting structure 260 is provided at the side of the accommodation groove close to the operation surface, and the limiting structure 260 is provided with the limiting groove 260*a*. The operation surface can be the ground.

In an embodiment of the present application, as shown in FIG. 3 and FIG. 4, a boss 2524 is provided at the side of the counterweight block 252 facing the limiting groove. The extension direction of the boss 2524 is at an angle to the moving direction of the counterweight block 252.

In this embodiment, the extending direction of the boss 2524 is perpendicular to the moving direction of the counterweight block 252. The side of the boss 2524 away from the counterweight block 252 is an arc surface. By setting the boss 2524 and the arc surface of the boss 2524, the contact area between the counterweight block 252 and the limiting groove 260*a* can be reduced, and the friction force experienced by the counterweight block 252 during movement can be reduced.

In this embodiment, there are a plurality of bosses 2524. As shown in FIG. 4, the number of bosses 2524 is three. The plurality of bosses 2524 can share the load and ensure the stability of the counterweight block 252.

In an embodiment of the present application, as shown in FIG. 1, FIG. 2, FIG. 5, FIG. 6 and FIG. 7, the robot body includes a main body 200 and two driving wheels 100. The main body 200 is provided with the installation cavity 210*a*, and two driving wheels 100 are respectively provided at opposite sides of the main body 200. Each driving wheel 100 includes: a rotating assembly 1, a support seat 3 and a driving piece 110.

The rotating assembly 1 is provided with an accommodating groove 1, and the notch of the accommodating groove 1 is sleeved on the outer sidewall of the main body 200, to allow the accommodating groove 1 to communicate with the installation cavity 210*a*.

The support seat 3 is connected to the main body 200, the support seat 3 is provided in the installation cavity 210*a* or the accommodation groove 1, and the support seat 3 is rotatably connected to the rotating assembly 1 through the bearing 2.

The driving piece 110 is provided in the installation cavity 210*a* or the accommodation groove 1, the driving piece 110 is provided at the support base 3 and is electrically connected to the control component, and the output end of the driving piece 110 is connected to the rotating assembly 1.

In this embodiment, as shown in FIG. 3, the control component includes a control module 220 and a power module 240. The power module 240 is electrically connected to the control module 220. The control module 220 is electrically connected to the electromagnetic device 251.

In this embodiment, the driving piece 110 is electrically connected to the control module 220.

The driving wheel 100 can be connected to the main body 200 through the support base 3. The support base 3 provides support and installation foundation for the driving piece 110. The control module 220 can control the operation of the driving piece 110 to control the operation of the rotating assembly 1. When rotating at the operation surface, the rotating assembly 1 can drive the robot to move, thereby controlling the operation state of the robot. The notch of the accommodation groove 1*a* of the rotating assembly 1 is sleeved on the outer wall of the main body 200 to eliminate gaps and beautify the appearance, which can also ensure that the rotating assembly 1 contacts with the operation surface when the robot is placed at the operation surface. There is a certain gap between the main body 200 and the operation surface, which can ensure that the main body 200 will not rub against the operation surface.

In this embodiment, the driving piece 110 may be a motor. The support base 3 is provided with a first assembly hole 3*d*, and the driving piece 110 is provided in the first assembly hole 3*d*.

In this embodiment, the rotating assembly 1 is connected to the support base 3 through the bearing 2 to make the rotating assembly 1 rotate. The robot can be a spherical robot including a main body 200 and two driving pieces 100. Different from the four wheels of a car, if the rotating assembly 1 is not connected to the support base 3 through the bearing 2, the rotating assembly 1 will only rotate around the motor shaft, that is, the rotating assembly 1 will only rotate around one point, which is unstable. After setting the rotating assembly 1 to be connected to the support base 3 through the bearing 2, the rotating assembly 1 can also rotate around the bearing 2, that is, the rotating assembly 1 can rotate around one surface, so that the rotation of the rotating assembly 1 is more stable, and the surface connection of the bearing 2 is stronger than the point connection of the motor shaft.

In addition, when using the robot, it is necessary to ensure that the main body 200 of the robot keeps as still as possible. Different from the balancing car which includes a middle position for someone to stand on, if the motor directly drives the rotating assembly 1 of the robot to rotate, it will easily cause the main body 200 to become unstable. However, the installation of the bearing 2 reduces the relative motion between the main body 200 and the rotating assembly 1, which can ensure that the main body 200 is more stable. That is to say, in this embodiment, while the counterweight structure 250 of the above embodiment is provided, the bearing 2 is also provided, which can ensure that the main body 200 keeps stable and the functional components of the main body 200 keep stable, thereby providing better user experience.

In addition, in this embodiment, there is no need to install a reduction gear between the driving piece 110 and the rotating assembly 1, which reduces the design difficulty.

In an embodiment of the present application, as shown in FIG. 2 and FIG. 3, the main body 200 includes: a main housing 210 and a loudspeaker module 230.

The main housing 210 is provided with the installation cavity 210*a* and a sound outlet 210*b* communicating with the installation cavity 210*a*, the sound outlet 210*b* is provided at the upper part of the main housing 210, and the support base 3 is detachably connected to the main housing 210.

The loudspeaker module 230 is provided above the counterweight structure 250. The loudspeaker module 230 includes a loudspeaker installation base 231 and a loudspeaker body 232, and the loudspeaker installation base 231 is provided at sidewall of the installation cavity 210*a*. A sound cavity is formed by an enclosure of the sidewall of the installation cavity 210*a* and the loudspeaker installation base 231. The loudspeaker body 232 is provided at the loudspeaker installation base 231 and is provided in the sound cavity, and the loudspeaker body 232 is provided at a position corresponding to the sound outlet 210*b*.

In this embodiment, the counterweight structure 250 is provided at the bottom wall of the installation cavity 210*a*. The loudspeaker module 230 and the power module 240 are arranged oppositely. The control module 220 and the counterweight structure 250 are provided between the loudspeaker module 230 and the power module 240 and are arranged oppositely. The above arrangement keeps the main body balanced.

It can be understood that the loudspeaker installation base 231 provides an installation foundation for the loudspeaker module 230. The loudspeaker body 232 is arranged at a position corresponding to the sound outlet 210*b*, which ensures that the sound emitted by the loudspeaker module 230 can be transmitted to the outside through the sound outlet 210*b*. A sound cavity is formed between the loudspeaker installation base 231 and the main housing 210 to accommodate the loudspeaker body 232, which is conducive to realize the sealing of the sound cavity to ensure the acoustic effect. In this embodiment, the main body 200 keeps stable, which can ensure that the sound emitting direction of the loudspeaker module 230 keeps stable and ensures the user experience effect.

It should be noted that the loudspeaker installation base 231 may be separated from the main housing 210, or may be integral with the main housing 210.

In an embodiment of the present application, as shown in FIG. 3, the sound emitting direction of the loudspeaker body 232 is arranged at an angle with the horizontal plane, and is inclined towards the upper side of the horizontal plane.

In an embodiment of the present application, as shown in FIG. 3, the line A shown in the figure is a horizontal plane, and the line B shown in the figure is the sound emitting direction of the loudspeaker body 232. The sound emitting direction of the loudspeaker body 232 is set at an angle with the horizontal plane, and is tilted towards the upper side of the horizontal plane, so that when the robot is placed at the operation surface, the sound emitting direction of the loudspeaker body 232 departs from the operation surface, resulting in better directivity, which is convenient for users to receive audio information.

It should be noted that other functional components can also be provided at the inner and outer sides of the main housing 210, which will not be repeated here.

Figure 6:
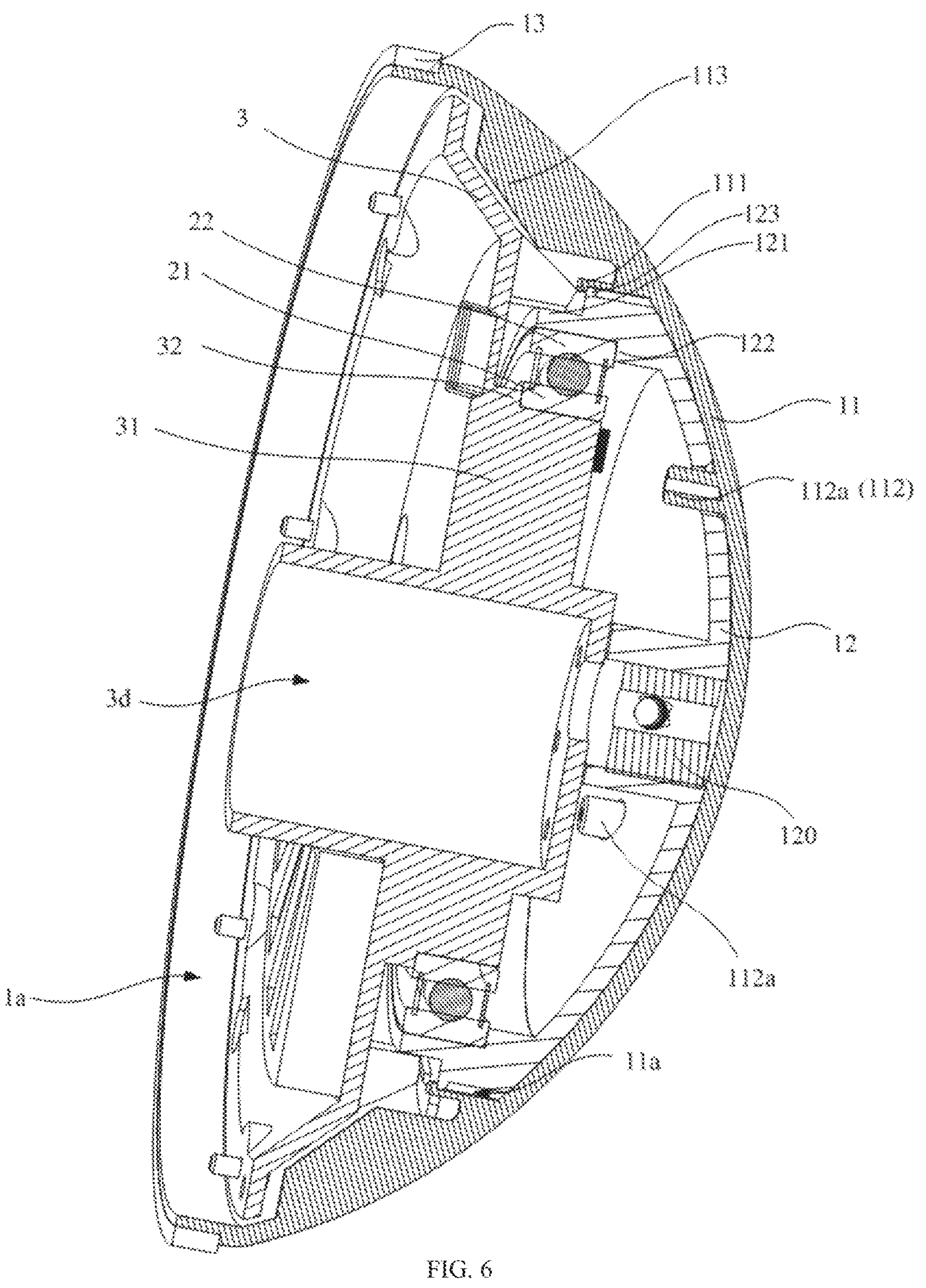
FIG. 6 is a schematic cross-sectional view of FIG. 5.
Figure 7:
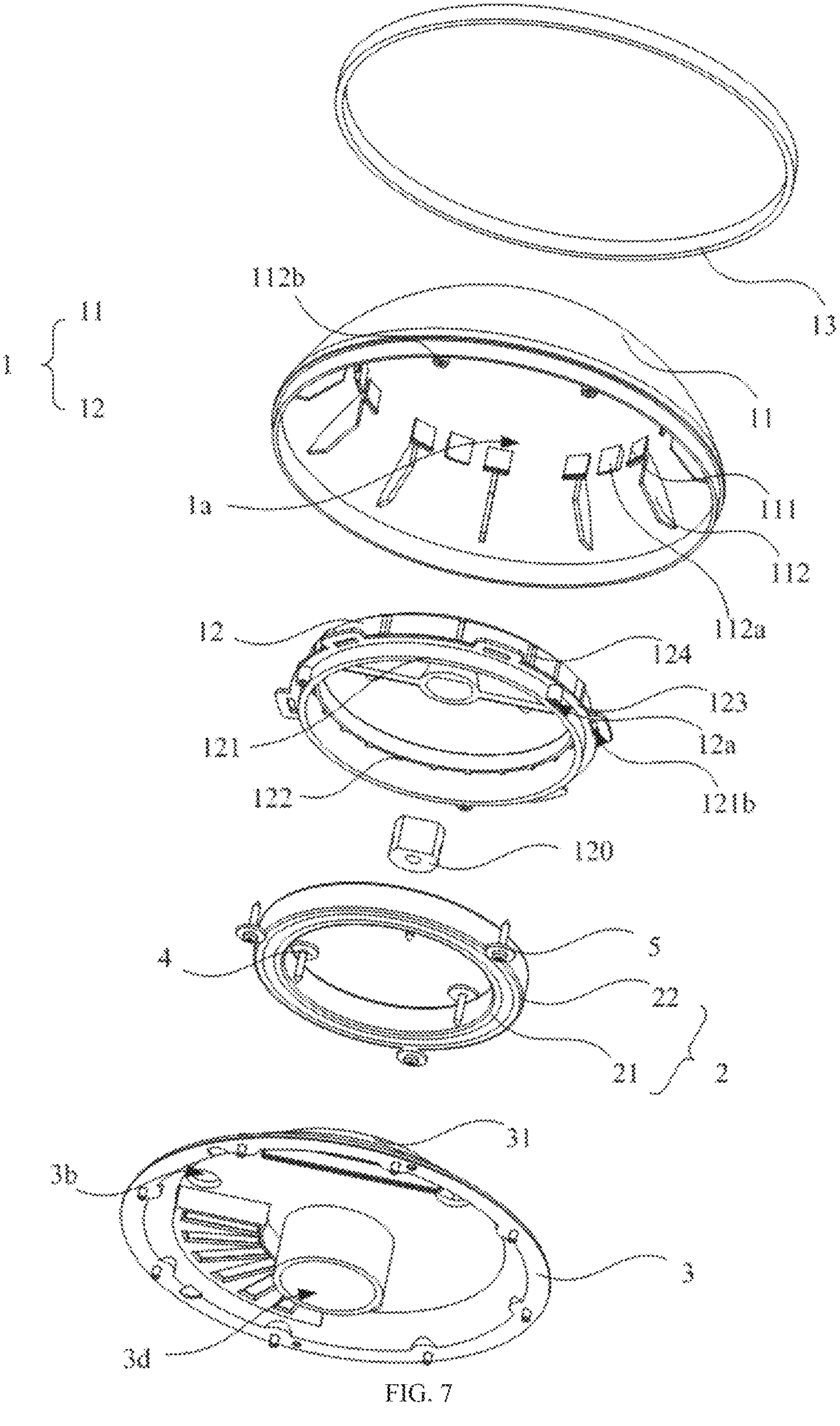
FIG. 7 is an exploded schematic view of FIG. 5.

In an embodiment of the present application, as shown in FIG. 6 and FIG. 7, the rotating assembly 1 includes: a housing 11 and a transmission piece 12.

The housing 11 is provided with the accommodation groove 1.

The transmission piece 12 is provided in the accommodation groove 1 and located between the housing 11 and the support base 3. The transmission piece 12 is connected to the bearing 2, and the transmission piece 12 is detachably connected to the housing 11.

It can be understood that the transmission piece 12 is connected to the bearing 2 to realize the purpose that the transmission piece 12 is able to rotate relative to the support base 3, and the rotation of the transmission piece 12 can drive the housing 11 to rotate. When the robot is placed on the ground or under other application scenarios, the housing 11 contacts with the ground, and the like, and the rotation of the housing 11 can drive the robot to move. In this embodiment, the housing 11 is provided with an accommodation groove 1*a*, and the transmission piece 12 is provided in the accommodation groove 1*a*. In this way, the transmission piece 12 can be hidden, so that the transmission piece 12 and the bearing 2 can be protected from external foreign matter, and the appearance can be beautiful. The transmission piece 12 is clamped with the housing 11, which enables convenient disassembly and installation between the housing 11 and the transmission piece 12. In this way, not only efficiency can be improved and difficulty can be reduced, but also damage to the housing 11 or the transmission piece 12 during the installation and disassembly process can be avoided.

In other embodiments, the rotating assembly 1 is an integrally formed mechanism, that is, the transmission piece 12 is integral with the housing 11, and the transmission piece 12 cannot be disassembled from the housing 11. That is to say, the transmission piece 12 is not provided separately.

Compared to the integrally formed and fixed arrangement between the housing 11 and the transmission piece 12, the detachable connection between the transmission piece 12 and the housing 11 can make the appearance of the robot more beautiful.

Figure 13:
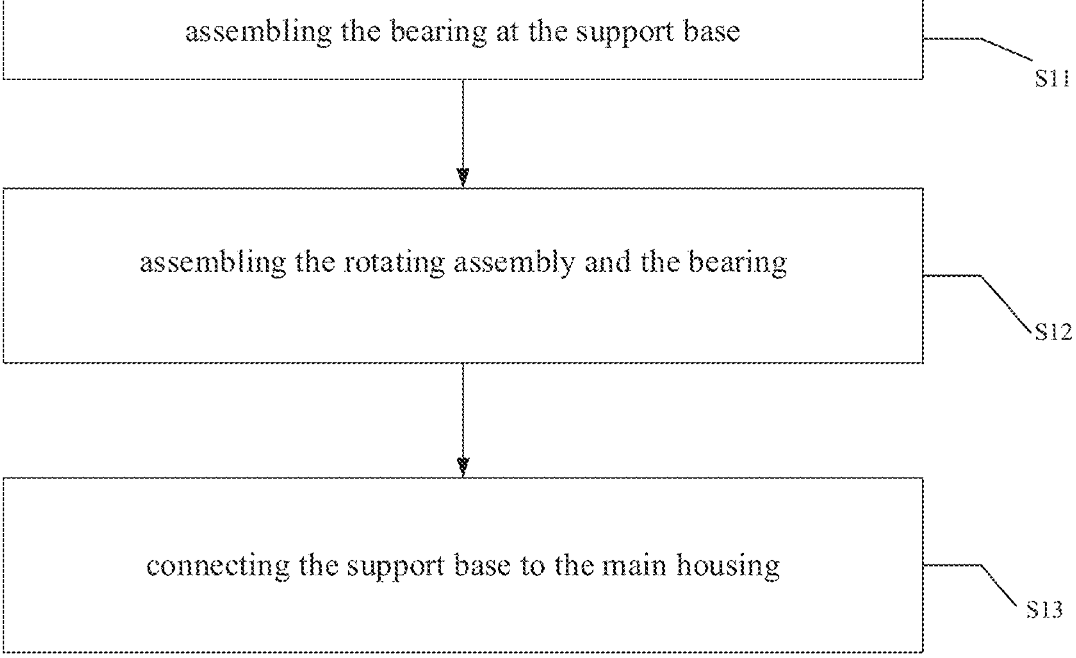
FIG. 13 is a schematic flowchart of an installation process of the driving wheel according to an embodiment of the present application.

In an embodiment, if the housing 11 and the transmission piece 12 are an integrally formed and fixed structure, then as shown in FIG. 13, the installation process of the driving wheel is as follows.

S11, first, assembling the bearing 2 at the support base 3. The first locking piece 4 in the following embodiment of the present application can be used to fixedly connect the bearing 2 and the support base 3. Furthermore, the bearing 2 can be connected to the support base 3 in an interference fit.

S12, assembling the rotating assembly 1 and the bearing 2. The second locking piece 5 in the following embodiment of the present application can be used to fixedly connect the bearing 2 and the rotating assembly 1. Furthermore, the bearing 2 can be connected to and the rotating assembly 1 in an interference fit. In this case, a driving wheel is formed.

S13, connecting the support base 3 to the main housing 210 to finish the assembly.

If the gap between the support base 3 and the main body 200 needs to be hidden, the support base 3 needs to be provided in the accommodation groove 1*a* of the rotating assembly 1. That is to say, the rotating assembly 1 can be used to block the gap between the support base 3 and the main body 200. However, in this case, it is inconvenient to use bolts to connect the support base 3 and the main body 200. The support base 3 can only be connected to the main body 200 by clamping, which will reduce the connection strength between the support base 3 and the main body 200. If the bolts are used to connect the support base 3 and the main body 200, the support base 3 may not be provided in the accommodation groove 1*a* of the rotating assembly 1. That is to say, the rotating assembly 1 is not used to block the gap between the support base 3 and the main body 200, and the gap is exposed, which will reduce the overall aesthetics of the robot. In addition, compared with the above situation of using the rotating assembly 1 to block the gap, the exposed gap makes dust and other foreign matter easier to enter the gap.

Figure 14:
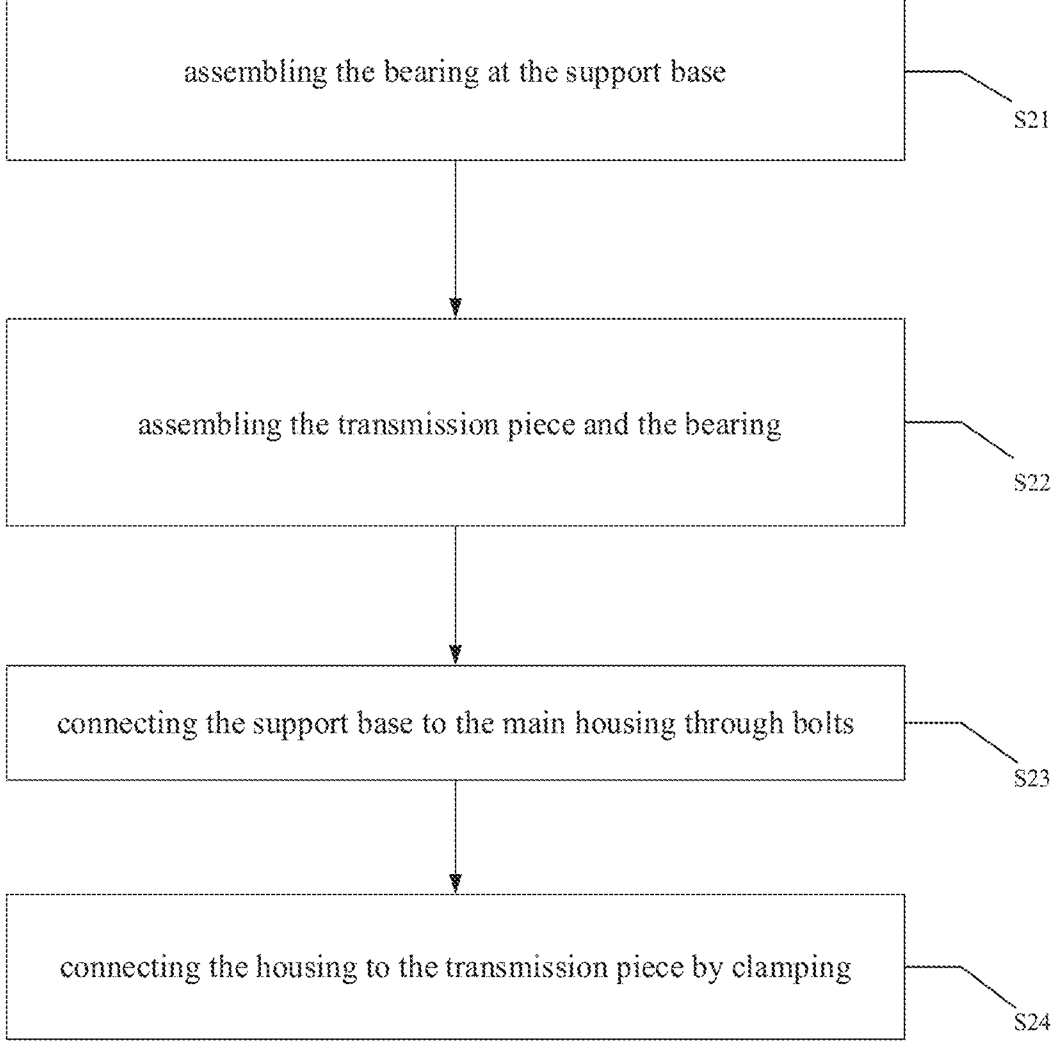
FIG. 14 is a schematic flowchart of an installation process of the driving wheel according to an embodiment of the present application.

When the transmission piece 12 is detachably connected to the housing 11, as shown in FIG. 14, the installation process of the driving wheel is as follows.

S21, first, assembling the bearing 2 at the support base 3. The first locking piece 4 in the following embodiment of the present application can be used to fixedly connect the bearing 2 and the support base 3. Furthermore, the bearing 2 can be connected to the support base 3 in an interference fit.

S22, assembling the transmission piece 12 and the bearing 2. The second locking piece 5 in the following embodiment of the present application can be used to fixedly connect the bearing 2 and the transmission piece 12. Furthermore, the bearing 2 can be connected to the transmission piece 12 in an interference fit.

S23, connecting the support base 3 to the main housing 210 through bolts.

S24, connecting the housing 11 to the transmission piece 12 by clamping.

As shown in FIG. 6 and FIG. 7, since the housing 11 is connected to the transmission piece 12 after the support base 3 is connected to the main body 200, the edge of the housing 11 can extend to a side of the support base 3 away from the transmission piece 12. That is to say, the housing 11 can be used to block the gap between the support base 3 and the main body. Therefore, compared with the embodiment without a separate transmission piece 12, when the transmission piece 12 is provided, the connection strength between the support base 3 and the main body 200 can be ensured (that is, bolts can be used to connect the support base 3 and the main body 200), and the aesthetic of the support base 3 and the main body 200 can also be ensured (that is, the gap at the connection between the support base 3 and the main body 200 can be blocked).

Figure 8:
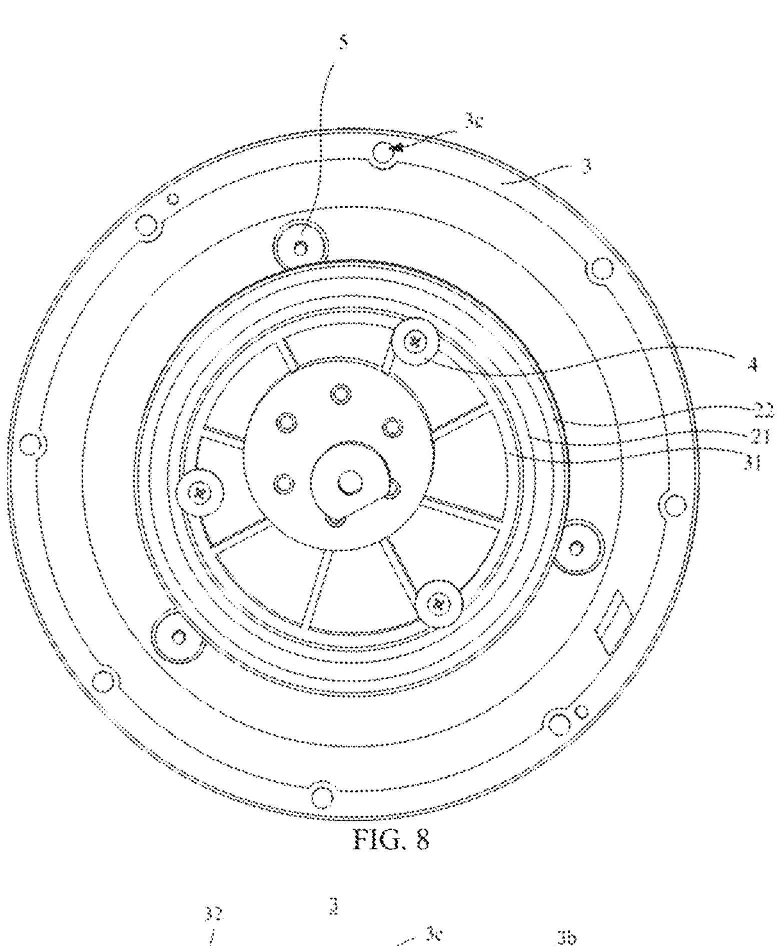
FIG. 8 is a schematic structural view in FIG. 5 without the rotating assembly.

In an embodiment of the present application, as shown in FIG. 6, FIG. 7 and FIG. 8, the support seat 3 and the transmission piece 12 are respectively connected to both sides of the bearing 2, and the side of the support seat 3 facing the transmission piece 12 is provided with a support portion 3. The inner ring 21 of the bearing 2 is sleeved on the support portion 31, and the first locking part 4 is used to lock the inner ring 21 and the support portion 31.

The side of the transmission part 12 facing the support base 3 is provided with a transmission portion 121. The transmission portion 121 is sleeved on the outer ring 22 of the bearing 2, and the second locking part 5 is used to locks the outer ring 22 and the transmission portion 121.

It can be understood that the structure can be made more compact through the above design. For the design of the support portion 31 and the transmission portion 121, the bearing 2 is sleeved on the support portion 31 and the transmission portion 121 is sleeved on the bearing 2, which can limit the position of the bearing 2. In addition, through the locking effect of the first locking part 4 and the second locking part 5, the position stability of the bearing 2 can be improved, and the connection stability between the bearing 2 and the support seat 3, the transmission part 12 can be improved, thereby improving he stability of the housing 11 to ensure the operation stability of the driving wheel 100. When the driving wheel 100 moves through the steps, the locking effect of the first locking part 4 and the second locking part 5 can ensure that the bearing 2 will not shake or deflect, to ensure that the driving wheel 100 can pass through the steps smoothly.

In addition, the support portion 31 can support the bearing 2 and provide positioning for the installation of the bearing 2, thereby achieving rapid installation.

Figure 9:
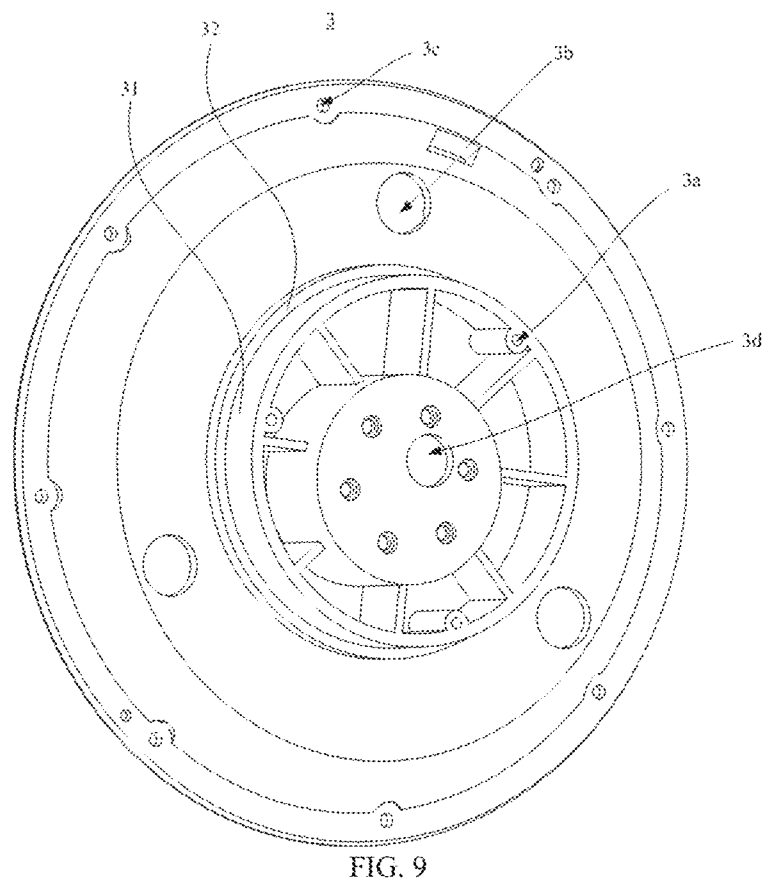
FIG. 9 is a schematic structural view of a support base in FIG. 5.

In an embodiment of the present application, as shown in FIG. 6, FIG. 8 and FIG. 9, a first limiting portion 32 is provided at the outer periphery of the support portion 31, and the side of the inner ring 21 facing the support base 3 abuts against the first limiting portion 32.

The support portion 31 is provided with a first installation hole 3*a*. One end of the first locking piece 4 respectively abuts against the side of the inner ring 21 away from the first limiting portion 32 and the side of the support seat 3 facing the transmission piece 12. The other end of the first locking piece 4 is inserted into the first installation hole 3*a*, so that the support portion 31 and the inner ring 21 are locked.

It can be understood that the first limiting portion 32 and the other end of the first locking piece 4 respectively abuts against the opposite sides of the inner ring 21 to limit the inner ring 21 and prevent the inner ring 21 from shaking or deflecting, thereby ensuring the positional stability of the inner ring 21.

In this embodiment, the first locking piece 4 includes a first connecting rod and a first clamping joint. The first connecting rod is connected to the first clamping joint. The outer periphery of the first connecting rod is provided with external threads. The hole wall of the first installation hole 3*a* is provided with internal threads. The first connecting rod is threadedly connected to the hole wall of the first installation hole 3*a*. The first connecting rod passes through the first clamping joint and is inserted into the first installation hole 3*a*, and the first clamping joint abuts against the side of the inner ring 21 away from the first limiting part 32, namely, the side of the inner ring 21 facing the transmission piece 12. In this case, a limiting space can be formed between the first limiting part 32 and the first clamping joint, and the inner ring 21 is limited in the limiting space to lock the inner ring 21 and the support seat 3. During assembly, the first locking piece 4 can be installed from the side where the transmission piece 12 is located, which is easy for installation.

In other embodiments, the inner ring 21 of the bearing 2 is provided with a first installation hole 3*a*, and the first locking piece 4 is inserted into the first installation hole 3*a* to lock the bearing 2 and the support portion 31. However, the bearing 2 is a standard part with a large hardness, so it is inconvenient to punch holes in the bearing 2. Therefore, the solution of punching the first installation hole 3*a* in the support portion 31 is better than the solution of punching the first installation hole 3*a* in the inner ring 21 of the bearing 2.

Figures 10, 11:
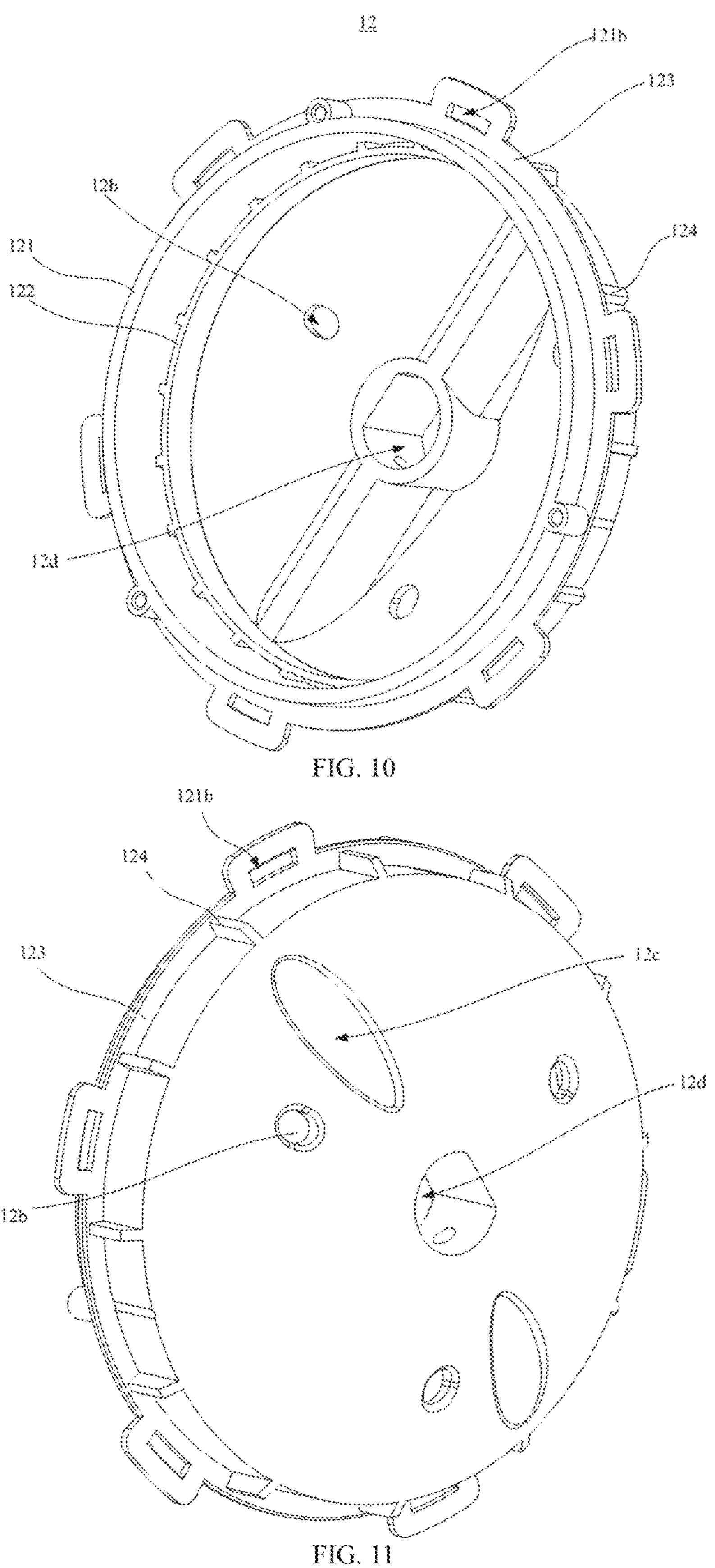
FIG. 10 is a schematic structural view of a transmission piece in FIG. 6.
FIG. 11 is a schematic structural view of FIG. 10 from another perspective.

In an embodiment of the present application, as shown in FIG. 6, FIG. 8 and FIG. 10, the side of the transmission portion 121 facing the bearing 2 is provided with a second limiting portion 122, and the side of the outer ring 22 facing the transmission piece 12 abuts against the second limiting portion 122.

The transmission portion 121 is provided with a second installation hole 12*a*. One end of the second locking piece 5 abuts against the side of the outer ring 22 away from the second limiting portion 122 and the side of the transmission portion 121 facing the support base 3. The other end of the second locking piece 5 is inserted into the second installation hole 12*a*, to lock the transmission portion 121 and the outer ring 22.

It can be understood that the second limiting portion 122 and the other end of the second locking piece 5 respectively abut with the opposite sides of the outer ring 22 to limit the outer ring 22 and prevent the outer ring 22 from shaking or deflecting, to ensure the positional stability of the outer ring 22.

In this embodiment, the second locking piece 5 includes a second connecting rod and a second clamping joint. The second connecting rod is connected to the second clamping joint. The outer periphery of the second connecting rod is provided with external threads. The hole wall of the second installation hole 12*a* is provided with internal threads. The second connecting rod is threadedly connected to the hole wall of the second installation hole 12*a*. The second connecting rod passes through the second clamping joint and then is inserted into the second installation hole 12*a*. Then the first clamping joint is pressed to abut against the side of the inner ring 21 away from the second limiting portion 122, namely, the side of the outer ring 22 facing the support base 3. In this case, a limiting space can be formed between the second limiting portion 122 and the second clamping joint. The outer ring 22 is limited in the limiting space to lock the outer ring 22 and the transmission piece 12. During assembly, the second locking piece 5 can be installed from the side where the support base 3 is located, which is easy for installation.

In other embodiments, the outer ring of the bearing is provided with a second installation hole 12*a*, and the second locking piece 5 is inserted into the second installation hole 12*a* to lock the bearing 2 and the transmission portion 121. However, the bearing 2 is a standard part with a large hardness, so it is inconvenient to punch holes in the bearing 2. Therefore, the solution of punching the second installation hole 12*a* in the transmission portion 121 is better than the solution of punching the second installation hole 12*a* in the outer ring 22 of the bearing 2.

Figure 5:
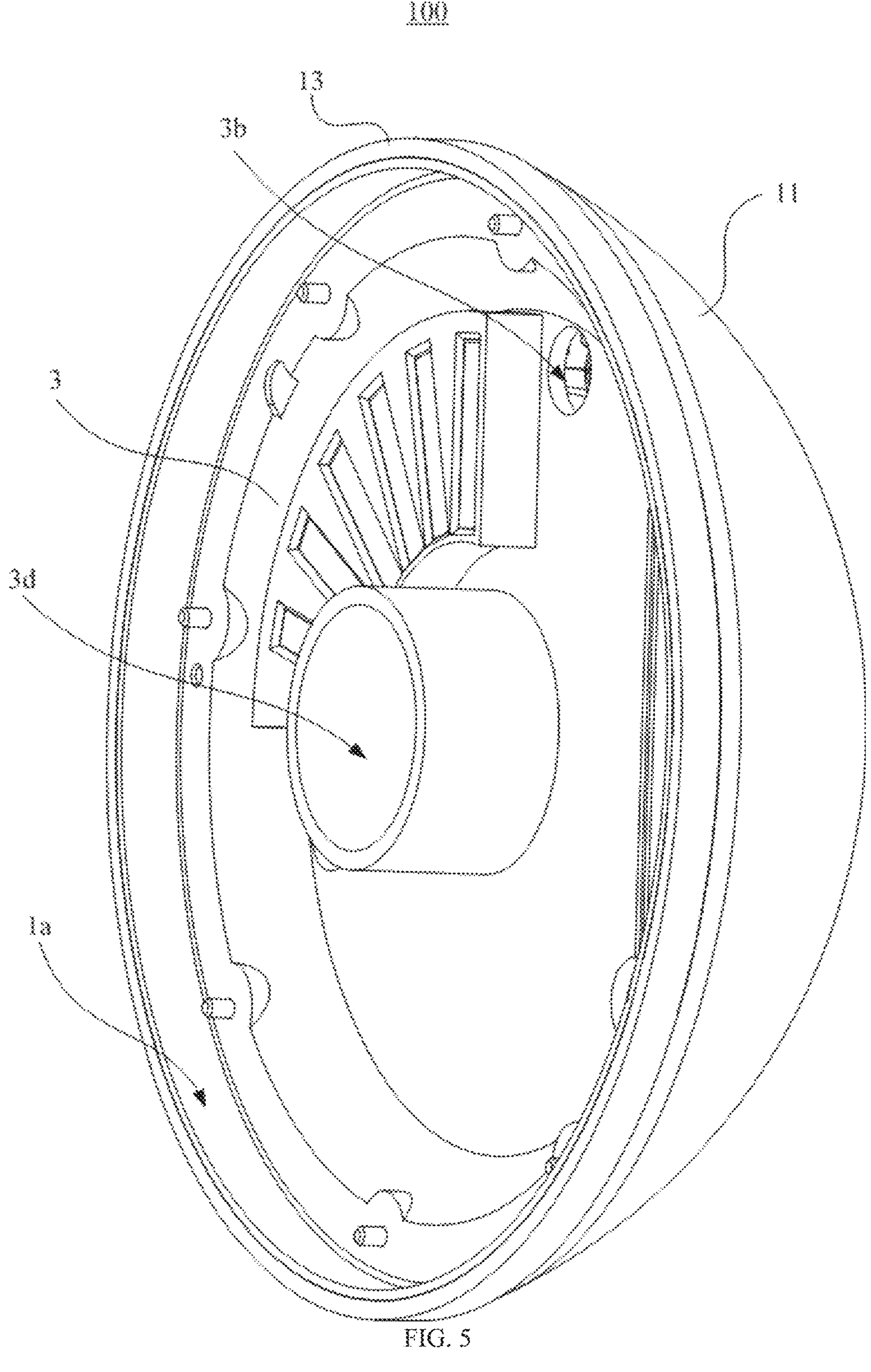
FIG. 5 is a schematic structural view of a driving wheel in FIG. 1.

In an embodiment of the present application, as shown in FIG. 5, FIG. 7 and FIG. 9, the support base 3 is provided with a first avoidance hole 3*b*, and the first avoidance hole 3*b* is located at a position corresponding to the second installation hole 12*a*.

It can be understood that the first avoidance hole 3*b* is provided at the support base 3 to provide position avoidance for the installation of the second locking piece 5 and facilitate the installation of the second locking piece 5.

In an embodiment of the present application, the transmission piece 12 is provided with a second avoidance hole, and the second avoidance hole is provided at a position corresponding to the first installation hole 3*a*.

It can be understood that the second avoidance hole is provided at the transmission piece 12 to provide position avoidance for the installation of the first locking piece 4 and facilitate the installation of the first locking piece 4.

In some embodiments, the support base 3 is provided with a first avoidance hole 3*b*, and the transmission piece 12 is provided with a second avoidance hole simultaneously.

In this embodiment, only the first avoidance hole is provided at the support base 3, and the transmission piece 12 is not provided with the second avoidance hole. During assembly, the first locking piece 4 can be installed first to install the bearing 2 at the support base 3. Then, the transmission piece 12 is sleeved on the bearing 2, and the first avoidance hole is used to install the second locking piece 5.

In this embodiment, there are a plurality of first installation holes 3*a*. The plurality of first installation holes 3*a* are distributed in a circular array. A first locking piece 4 is installed in each first installation hole 3*a*. Through a plurality of first installation holes 3*a*, the locking stability between the inner ring 21 and the support portion 31 can be improved. There are also a plurality of second installation holes 12*a*. The plurality of second installation holes 12*a* are distributed in a circular array. A second locking piece 5 is installed in each second installation hole 12*a*. Through the plurality of second installation holes 12*a*, the locking stability between the outer ring 22 and the transmission portion 121 can be improved.

Figure 12:
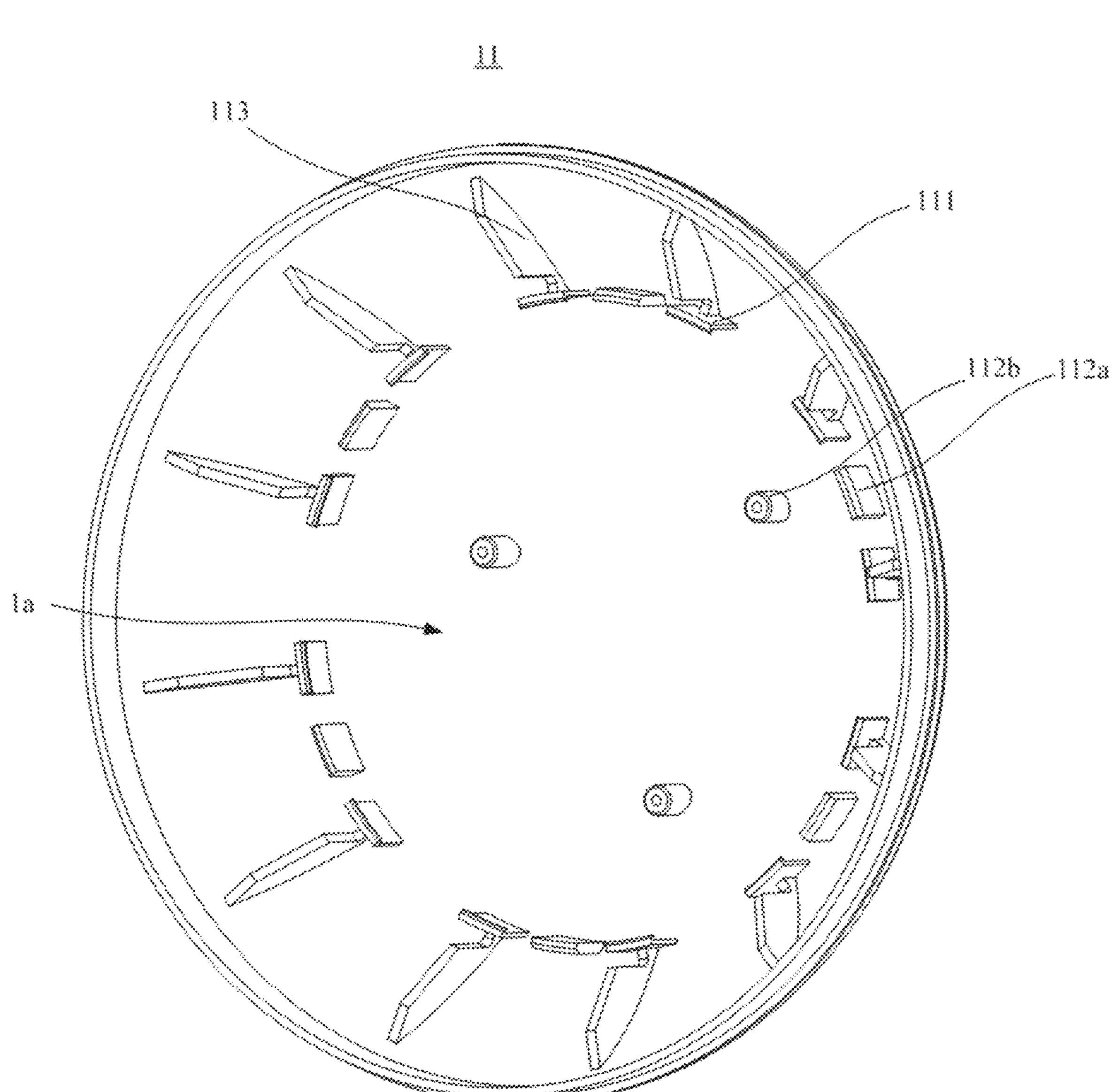
FIG. 12 is a schematic structural view of a housing in FIG. 5.

In an embodiment of the present application, as shown in FIG. 6 and FIG. 12, the cavity wall of the accommodation groove 1*a* is provided with a hook 111, and a limiting groove 11*a* is formed by an enclosure of the hook 111 and the groove wall of the accommodation groove 1*a*. The transmission piece 12 is partially limited in the limiting groove 11*a*.

In some embodiments, the transmission piece 12 can be connected to the housing 11 through various connection methods, such as screw connection or clamping connection. In this embodiment, the transmission piece 12 is clamped with the housing 11. In this way, not only convenient disassembly and installation between the housing 11 and the transmission piece 12 can be achieved, but also efficiency can be improved and difficulty can be reduced. Further, damage to the housing 11 or the transmission piece 12 during the installation and disassembly process can be avoided, and the appearance can be more beautiful. In addition, the transmission piece 12 is clamped with the housing 11, which can avoid punching screw holes in the housing 11 and can ensure a beautiful appearance. By providing the hook 111, the transmission piece 12 can be detachably connected to the housing 11, so that the structure is compact, the connection is stable, and punching holes in the housing 11 can be avoided, thereby ensuring a beautiful appearance.

In an embodiment of the present application, as shown in FIG. 6, FIG. 10 and FIG. 11, the outer periphery of the transmission piece 12 is provided with a clamping portion 123, and the clamping portion 123 is provided in the limiting groove 11*a*. The side of the clamping portion 123 facing the housing 11 is provided with an inclined surface, and the side of the clamping portion 123 away from the housing 11*a* buts against the hook 111. The side of the transmission piece 12 away from the support base 3 abuts against the cavity wall of the accommodation groove 1*a* and the shape of the side of the transmission piece 12 away from the support base 3 matches with the cavity wall of the accommodation groove 1*a*.

It can be understood that the side of the clamping portion 123 away from the housing 11*a* buts against the hook 111, and the side of the transmission piece 12 away from the support base 3 abuts against the cavity wall of the accommodation groove 1*a*, so that the transmission piece 12 is partially limited in the limiting groove 11*a*. In addition, the transmission piece 12 abuts against the cavity wall of the accommodation groove 1*a* and the shape of the transmission piece 12 matches with the cavity wall of the accommodation groove 1*a*, so that the transmission piece 12 can support the housing 11. When a collision occurs in the area of the housing 11 corresponding to the transmission piece 12, namely the middle part of the housing 11, the housing 11 can be prevented from being dented.

The side of the clamping portion 123 facing the housing 11 is provided with an inclined surface, and correspondingly, the hook 111 is also provided with an inclined surface to facilitate the assembly between the housing 11 and the transmission piece 12.

In this embodiment, as shown in FIG. 10 and FIG. 11, a first reinforcing rib 124 is provided at the side of the clamping portion 123 facing the housing 11, which can improve the strength of the clamping portion 123.

In an embodiment of the present application, as shown in FIG. 6, FIG. 7 and FIG. 12, a second reinforcing rib 113 is provided at the side of the hook 111 away from the limiting groove 11*a*, which can improve the strength of the hook 111.

The second reinforcing rib 113 extends towards the support base 3 and is spaced apart from the support base 3. The shape of the side of the second reinforcing rib 113 close to the support base 3 matches with the shape of the support base 3. When a collision occurs in the area of the housing 11 corresponding to the second reinforcement rib 113, that is, the area close to the edge of the housing 11, large deformation of the housing 11 can be avoided. When the housing 11 dents inwards, the second reinforcement rib 113 will abut against the support base 3, and the support seat 3 can support the housing 11. In addition, the second reinforcing rib 113 is spaced apart from the support base 3, so that the housing 11 can deform slightly and play a buffering and shock-absorbing role.

In an embodiment of the present application, as shown in FIG. 6, FIG. 7, FIG. 10, FIG. 11 and FIG. 12, the transmission piece 12 is provided with a plurality of positioning holes, and the cavity wall of the accommodation groove 1*a* is provided with a plurality of positioning columns 112, and each positioning column 112 is inserted into one positioning hole.

It can be understood that the cooperation between the positioning hole and the positioning column 112 can realize the rapid positioning and installation between the housing 11 and the transmission piece 12, and ensure the synchronous rotation of the transmission piece 12 and the housing 11.

In this embodiment, the positioning holes include a first positioning hole 121*b* and a second positioning hole 12*b*, and the positioning column 112 includes a first positioning column 112*a* and a second positioning column 112*b*.

The clamping portion 123 is provided at the side of the transmission ring away from the bearing 2. A plurality of positioning bosses protrude from the periphery of the clamping portion 123. The plurality of positioning bosses are arranged at intervals, and each positioning boss is provided with a first positioning hole 121*b*. Correspondingly, the housing 11 is provided with a plurality of first positioning columns 112*a*. Each first positioning column 112*a* matches with a first positioning hole 121*b*.

The middle area of the transmission piece 12 is provided with a plurality of second positioning holes 12*b*. The plurality of second positioning holes 12*b* are arranged at intervals. Correspondingly, the housing 11 is provided with a plurality of second positioning columns 112*b*. Each second positioning column 112*b* matches with a second positioning hole 12*b*.

In the above design, positioning holes can be provided in the peripheral and middle areas of the transmission piece 12, and the housing 11 is provided with corresponding positioning columns 112, which can ensure that the force is evenly distributed when power is transmitted between the transmission piece 12 and the housing 11.

In an embodiment of the present application, as shown in FIG. 9, a third installation hole 3*c* is provided at the edge of the support base 3, and the projection of the transmission piece 12 on the support base 3 is located in the side of the third installation hole 3*c* close to the center line of the support base 3.

It can be understood that the projection of the transmission member 12 on the support base 3 is located on the side of the third installation hole 3*c* close to the center line of the support base 3, that is, the peripheral size of the transmission piece 12 is smaller than the peripheral size of the support base 3, and the third installation hole 3*c* can be exposed. When the support base 3 is connected to the outside through bolts inserted into the third installation hole 3*c*, the operation can be facilitated, and the transmission piece 12 will not affect the operation process.

In this embodiment, there are a plurality of third installation holes 3*c* distributed in a circular array.

In an embodiment of the present application, as shown in FIG. 5, FIG. 6, FIG. 7 and FIG. 1, the rotating assembly 1 further includes a friction belt 13, and an installation groove is provided at the outer periphery of the housing 11. The friction belt 13 is provided in the installation groove and partially extends out of the installation groove.

It can be understood that when the driving wheel 100 operates on the ground, the friction belt 13 can be provided to increase the friction between the friction belt 13 and the ground, ensuring that the driving wheel 100 moves smoothly on the ground and reducing slippage.

In this embodiment, as shown in FIG. 7, the rotating assembly 1 also includes a connection piece 120. The transmission piece 12 is provided with a second assembly hole 12*d*. The connection piece 120 is accommodated in the second assembly hole 12*d*. The connection piece 120 is sleeved on the output end of the driving piece 110, and the connection piece 120 is locked to the rotating assembly 1 through a third locking piece. The cross-section of the connection piece 120 is D-shaped, that is, the circumference of the connection piece 120 is provided with the arc surface and the plane surface connected end-to-end. Correspondingly, the second assembly hole 12*d* is D-shaped, and the second assembly hole 12*d* matches with the connection piece 120, so that relative rotation between the rotating assembly 1 and the output end of the driving piece 110 will not occur, ensuring that the output end of the driving piece 110 drives the rotating assembly 1 to rotate synchronously.

In an embodiment of the present application, the transmission piece 12 is provided with a fourth installation hole 12*c*. The fourth installation hole 12*c* is provided at a position corresponding to the third locking piece. The third locking piece passes through the fourth installation hole 12*c*. The third locking piece locks and connects the transmission piece 12, the connection piece 120 and the output end of the driving piece 110. The fourth installation hole 12*c* provides an avoidance position for the installation of the third locking piece to facilitate installation. Obviously, since the transmission piece 12 is detachably connected to the housing 11, the fourth installation hole 12*c* can be provided at the transmission piece 12 to ensure that the third locking piece can be installed smoothly. In addition, due to the limited cooperation between the aforementioned second assembly hole 12*d* and the connection piece 120, the torque on the third locking piece during rotation can be reduced, and the stability and service life of the third locking piece can be improved.

In some embodiments, the connection piece 120 is locked to the output end of the driving piece 110 in an interference fit.

In this embodiment, as shown in FIG. 6, FIG. 10 and FIG. 11, since the bearing 2 is the main connection component, priority is given to the interference fit between the bearing 2 and the rotating assembly 1 or the support base 3. Besides, further stabilization can be achieved by the first locking piece 4 and the second locking piece 5, and the output end of the driving piece 110 does not interfere with the second assembly hole 12*d*. If all three places interfere, that is, all three places are in the precise fit, it is technically challenging to achieve. Since the second installation hole 12*d* is not in the interference fit, it is easy to cause the rotating assembly 2 to shake. In order to improve stability, a fourth installation hole 12*c* needs to be provided to install the third locking piece. In addition, if the transmission piece 12 and the housing 11 are not detachable structures, the fourth installation hole 12*c* needs to be punched on the outer surface of the rotating assembly 1, which is unaesthetic. If the fourth installation hole 12*c* is not provided for satisfying the aesthetic, the stability will be reduced. Therefore, the structure that the transmission piece 12 is detachably connected to the housing 11 is better than the structure that the transmission piece 12 is integral with the housing 11.

In addition, the above content is only used to illustrate the further beneficial effects brought by the installation of the transmission piece 12, such as blocking gaps, stability, aesthetic, and the like, which does not mean that the transmission piece 12 is a necessary technical feature.

Similarly, the interference fit between the inner ring and the outer ring of the bearing is also a further beneficial effect, or an effective effect that can be achieved on the basis of the transmission part 12, but is not a necessary technical feature.

In this embodiment, the third locking piece is a bolt.

In this embodiment, the output end of the driving piece 110 is provided with a threaded hole, and the third locking piece is threadedly connected to the output end of the driving piece 110. In other embodiments, the third locking piece abuts against the outer peripheral wall of the output end of the driving piece 110. It can be understood that the third locking piece is threadedly connected to the output end of the driving piece, which can improve the connection strength and connection stability between the transmission piece 12, the connection piece 120 and the output end of the driving piece 110, and can ensure the stability between the transmission piece 12 and the housing 11. In addition, the synchronous rotation between the transmission piece 12 and the output end of the driving piece 110 can be ensured.

The present application further provides a method for controlling a robot, which includes the following steps:

obtaining the operation state of the robot; and controlling the electromagnetic device 251 of the counterweight structure 250 to be powered on or off to adjust the position of the center of gravity of the robot according to the operation state of the robot.

The specific structure of the robot may refer to the above-mentioned embodiments. Since the method for controlling the robot adopts the technical solutions of all the above-mentioned embodiments, it has at least all the beneficial effects brought by the technical solutions of the above-mentioned embodiments, which will not be repeated here.

In an embodiment of the present application, the operation state of the robot can be determined by the operation acceleration of the robot, that is, the operation acceleration of the robot can be obtained.

If the operation acceleration of the robot is greater than or less than zero, the electromagnetic device 251 is controlled to be powered on, so that the moving direction of the counterweight block 252 is consistent with the acceleration direction.

It can be understood that when the operation acceleration of the robot is greater than or less than zero, it is determined that the robot is in an acceleration state or in a deceleration state. In this case, the control component can be used to control the electromagnetic device 251 to be powered on, to adjust the position of the center of gravity of the counterweight structure 250 to adapt to the acceleration or deceleration operation timely and quickly. When the operation acceleration of the robot is equal to zero, the electromagnetic device 251 is controlled to be powered off, so that the center of gravity of the counterweight structure 250 returns to the initial position, ensuring the smooth operation of the robot.

In an embodiment of the present application, the energization amount of the coil 2512 of the electromagnetic device 251 is controlled according to the value of the robot's operation acceleration, to accurately control the moving position and speed of the counterweight block 252.

In another embodiment of the present application, the operation state of the robot can be obtained directly according to the user operation instructions. When the control instruction is to startup or stop the robot, the electromagnetic device 251 is controlled to be powered on, and the center of gravity of the counterweight structure is adjusted timely, thereby adjusting the center of gravity of the robot. In this way, the robot may keep stable at all times, and it can be ensured that each functional component of the robot can keep stable, thereby providing a better user experience.

The above-mentioned embodiments are only some embodiments of the present application, and are not intended to limit the scope of the present application. Under the creative concept of the present application, any equivalent structure conversion made with reference to the description and the accompanying drawings of the present application, directly or indirectly applied in other related technical fields, should all fall in the scope of the present application.

What is claimed is:

1. A robot, comprising:

a robot body provided with an installation cavity, wherein a control component is provided in the installation cavity; and a counterweight structure, wherein the counterweight structure comprises an electromagnetic device, a counterweight block and a reset piece, the reset piece is clamped between the electromagnetic device and the counterweight block, the electromagnetic device is magnetic after being powered on, to attract the counterweight block to move towards the electromagnetic device and compress the reset piece, the counterweight structure is provided in the installation cavity, the electromagnetic device of the counterweight structure is electrically connected to the control component, and the control component is configured to control the electromagnetic device to be powered on or off;

the robot body comprises a main body and two driving wheels, the main body is provided with the installation cavity, the two driving wheels are respectively provided at two opposite sides of the main body; and each of the two driving wheels comprises:

a rotating assembly, wherein the rotating assembly is provided with an accommodation groove, and a notch of the accommodation groove is sleeved at an outer sidewall of the main body, to allow the accommodation groove to communicate with the installation cavity;

a support seat connected to the main body, wherein the support seat is provided in the installation cavity or the accommodation groove, and the support seat is rotationally connected to the rotating assembly through a bearing; and a driving piece provided in the installation cavity or the accommodation groove, wherein the driving piece is provided at the support seat and is electrically connected to the control component, and an output end of the driving piece is connected to the rotating assembly.

2. The robot of claim 1, wherein a cavity wall of the installation cavity is provided with a limiting groove, and a part of the counterweight block of the counterweight structure is movably limited in the limiting groove.

3. The robot of claim 1, wherein the rotating assembly comprises:

a housing provided with the accommodation groove; and a transmission piece provided in the accommodation groove and located between the housing and the support seat, wherein the transmission piece is connected to the bearing, and the transmission piece is detachably connected to the housing.

4. The robot of claim 1, wherein the main body comprises:

a main housing provided with the installation cavity and a sound outlet communicating with the installation cavity, wherein the sound outlet is provided at an upper part of the main housing; and a loudspeaker module provided above the counterweight structure, wherein the loudspeaker module comprises a loudspeaker installation base and a loudspeaker body, the loudspeaker installation base is provided at a sidewall of the installation cavity, a sound cavity is formed by an enclosure of the loudspeaker installation base and a cavity wall of the installation cavity, the loudspeaker body is provided at the loudspeaker installation base and is provided in the sound cavity, and the loudspeaker body is provided at a position corresponding to the sound outlet.

5. A method for controlling the robot of claim 1, comprising following steps:

obtaining an operation state of the robot; and controlling the electromagnetic device of the counterweight structure to be powered on or off to adjust a center of gravity of the robot according to the operation state of the robot.

6. The robot of claim 1, wherein the electromagnetic device comprises:

an inner core provided at a position corresponding to the counterweight block, wherein the reset piece is clamped between the inner core and the counterweight block; and a coil winding around an outer periphery of the inner core, wherein after the coil is powered on, the inner core is magnetized to attract the counterweight block to move towards the inner core.

7. The robot of claim 6, wherein the inner core is provided with a mating hole, the counterweight block is provided with a sliding rod, the sliding rod is movably provided in the mating hole, and the reset piece is sleeved on the sliding rod.

8. The robot of claim 1, wherein:

the counterweight structure comprises two electromagnetic devices and two reset pieces;

the two electromagnetic devices are respectively provided at two opposite sides of the counterweight block, and each of the two reset pieces is clamped between the counterweight block and one of the two electromagnetic devices; and/or the reset piece is a spring.

* * * * *